US006230161B1

(12) United States Patent
Berkland et al.

(10) Patent No.: US 6,230,161 B1
(45) Date of Patent: May 8, 2001

(54) DYNAMIC EXPRESSION EDITOR

(75) Inventors: Philip Theodore Berkland, Austin, TX (US); Howard Justin Glaser, San Jose, CA (US); Stewart Earle Nickolas, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/127,473

(22) Filed: Jul. 31, 1998

(51) Int. Cl.$^7$ .................................................. G06F 17/30

(52) U.S. Cl. .............................................................. 707/103

(58) Field of Search ................................... 707/103, 102; 709/303, 315; 345/433, 435, 340, 341, 342, 343, 347

(56) References Cited

U.S. PATENT DOCUMENTS

| 5,414,806 | * | 5/1995 | Richards | 345/435 |
| 5,640,546 | * | 6/1997 | Gopinath et al. | 713/400 |
| 6,088,739 | * | 7/2000 | Pugh et al. | 709/315 |

FOREIGN PATENT DOCUMENTS

| 0 733 970 | 9/1996 | (EP) | G06F/9/46 |

OTHER PUBLICATIONS

Ossher et al., "Subject–oriented composition rules", OOPSLA 95, pp. 235–250, Oct. 1995.*

Kung et al., "Object–oriented real time systems modeling and verification", Proceedings: Third international workshop on object–oriented real time dependable systems, pp. 224–231, Feb. 1997.*

Kentaro Shimizu et al., "Hierarchical Object Groups in Distributed Operating Systems", Proceedings of the International Conferecne on Distributed Computing Systems, U.S., Washington, IEEE Comp. Soc. Press, 1998, pp. 18–24.

* cited by examiner

*Primary Examiner*—Hosain T. Alam
*Assistant Examiner*—Sanjiv Shah
(74) *Attorney, Agent, or Firm*—Gates & Cooper LLP

(57) ABSTRACT

A system, method, and article of manufacture for intuitively defining new attributes and methods as a function of existing attributes and methods is described. The method comprises the steps of creating a composite object having object elements including methods and attributes combined according to a composition rule, displaying a view of expression elements comprising the attributes and methods of the composite object, defining an object element expression combining at least two of the expression elements, and forming the hybrid object element from the selected expression elements. In one embodiment, a drop-down list is used to select a series of attributes, methods and operators that comprise the expression defining the hybrid element. The apparatus comprises means for performing the operations above, including a computer with a processor and memory coupled to a data storage device and a display. The article of manufacture comprises a tangible embodiment of instructions for performing the foregoing operations.

24 Claims, 15 Drawing Sheets

DYNAMIC EXPRESSION EDITOR

CROSS-REFERENCE TO RELATED APPLICATIONS

This application is related to the following co-pending and commonly assigned application, which application is hereby incorporated by reference herein:

application Ser. No. 09/127,467, filed on same date herewith, now pending by Philip T. Berkland, Howard J. Glaser, David J. Kuettel, Stewart E. Nickolas, and John C. Sanchez, entitled "Method for Defining Composed Object Methods and Attributes by Dynamically Presenting Composite Values and Options".

BACKGROUND OF THE INVENTION

1. Field of the Invention

The present invention relates to systems and methods of object-oriented programming, and in particular to a method and system for creating new object methods and object attributes and for editing existing methods and attributes.

2. Description of the Related Art

Object oriented programming has become increasingly popular among software developers, because it offers the benefits of increased application portability, interoperability, and interchangeability. Object-oriented programming techniques also reduce development risk and software development costs, and can extend the life cycle of the final product to prevent premature obsolescence.

An industry consensus standard interface definition for interoperable software, known as the Common Object Request Broker Architecture (COBRA) has been defined. COBRA simplifies the development and deployment of distributed systems software in several ways. First, COBRA defines a distributed environment using an object-oriented paradigm, which hides differences between programming languages, operating systems, and object locations. Second, COBRA's object oriented approach allows diverse types of implementations to inter-operate at the same level, hiding idiosyncrasies and supporting reuse.

A central component of COBRA is an Object Request Broker (ORB), which functions as a communications infrastructure, transparently transceiving object requests across distributed heterogeneous computing environments. This is accomplished through a well-defined interface called the Interface Definition Language (IDL). Further details regarding COBRA are set forth in "The Essential Cobra, Systems Integration Using Distributed Objects," by Thomas W. Mobray and Ron Zahavi, 1995, which publication is hereby incorporated by reference herein.

Toolkits are available to support the COBRA programming model and allow users to use visual tools to generate applications by creating new objects, edit existing objects, generate dynamic link libraries (DLLs), and package applications so they can be published to a server.

However, although existing tools allow new objects to be defined and edited, these tools do not allow the user to create composite objects by combining user-selectable elements of existing objects under user-definable rules. What is needed is a system and method which allow the user to create new objects by combining elements of existing objects and which provides a simple and intuitive interface for doing so. The present invention satisfies that need.

SUMMARY OF THE INVENTION

To address the requirements described above, the present invention discloses a system, method, and article of manufacture for intuitively defining new attributes and methods as a function of existing attributes and methods.

The method comprises the steps of creating a composite object having object elements including methods and attributes combined according to a composition rule, displaying a view of expression elements comprising the attributes and methods of the composite object, defining an object element expression combining at least two of the expression elements, and forming the hybrid object element from the selected expression elements. In one embodiment, a drop-down list is used to select a series of attributes, methods and operators that comprise the expression defining the hybrid element.

The apparatus comprises means for performing the operations above, including a computer with a processor and memory coupled to a data storage device and a display. The article of manufacture comprises a tangible embodiment of instructions for performing the foregoing operations.

BRIEF DESCRIPTION OF THE DRAWINGS

Referring now to the drawings in which like reference numbers represent corresponding parts throughout.

DETAILED DESCRIPTION OF PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
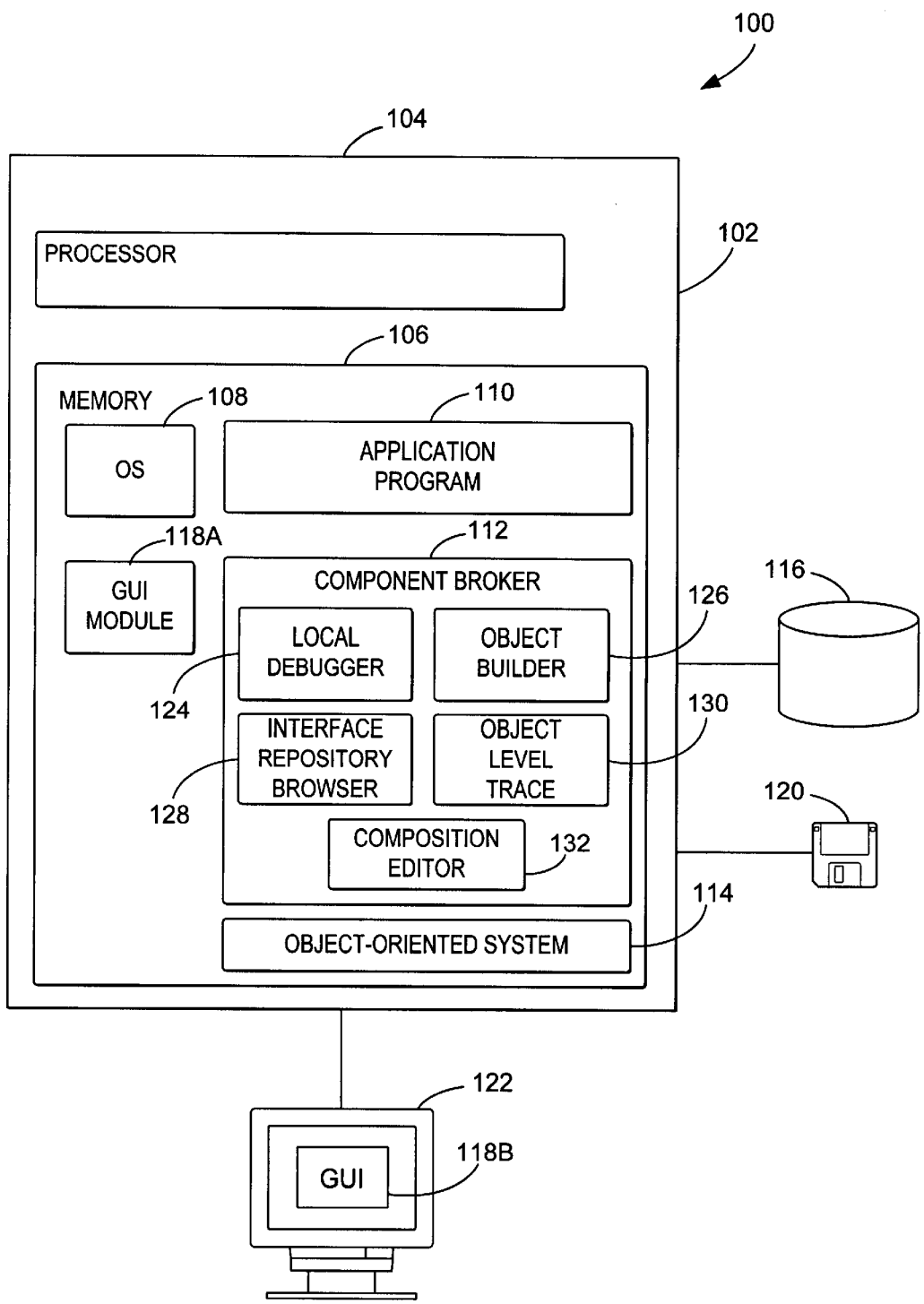
FIG. 1 is a block diagram illustrating a computer environment that may be used to practice the present invention.

FIG. 1 illustrates an exemplary computer system 100 that could be used to implement the present invention. The computer 102 comprises a processor 104 and a memory (RAM) 106. The computer 102 is operatively coupled to a display 122, which presents images such as windows to the user on a graphical user interface 118B. The computer 102 may be coupled to other devices, such as a keyboard, a mouse device, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the application program 110, or implemented with special purpose memory and processors. The computer 102 implements a component broker 112 which comprises a suite of tools which allows an application program 110 to be created from an object oriented system 114. After completion, the application 110 accesses and manipulates an object-oriented system 114 stored in the memory 106 of the computer 102 using the relationships and logic that was generated using the component broker 112.

In one embodiment, the operating system 108, the computer program 110, the component broker 112, and the object-oriented system 114 are tangibly embodied in a computer-readable medium, e.g., data storage device 116, which could include one or more fixed or removable data storage devices, such as a zip drive, floppy disc drive 120, hard drive, CD-ROM drive, tape drive, etc. Further, the operating system 108, the computer program 110, and the component broker 112 are all comprised of instructions which, when read and executed by the computer 102, causes the computer 102 to perform the steps necessary to implement and/or use the present invention. Of course, those skilled in the art will recognize many modifications may be made to this configuration without departing from the scope of the present invention.

The Component Broker

The component broker 112 provides a suite of tools that allows the user to write applications in an object oriented programming context. These tools include an object builder 126, a local debugger 124, an object level trace 130, an interface repository browser 128, and a composition editor 132.

The local debugger 124 and object level trace (OLT) 130 are used to perform interactive, modular testing and debugging of applications.

The interface repository browser 128 can configure on-line help, view object definitions and relationships among definitions, as well as search and modify objects in the repository.

The object builder 126 is used to generate applications for visual tools for C++ and Java by creating and working with components. A component is a distributed set of objects that client applications can be accessed as a single entity, and which work together to represent the logic and data relationships that perform a desired function for the user. Although components generally comprise a plurality of objects, each with a set of methods and attributes, the component is presented to the client application as a single class, with set of methods and attributes like any other class. However, although the objects are presented in a single interface, each component can include multiple objects on both a client and a server.

Managed Objects

Figure 2:
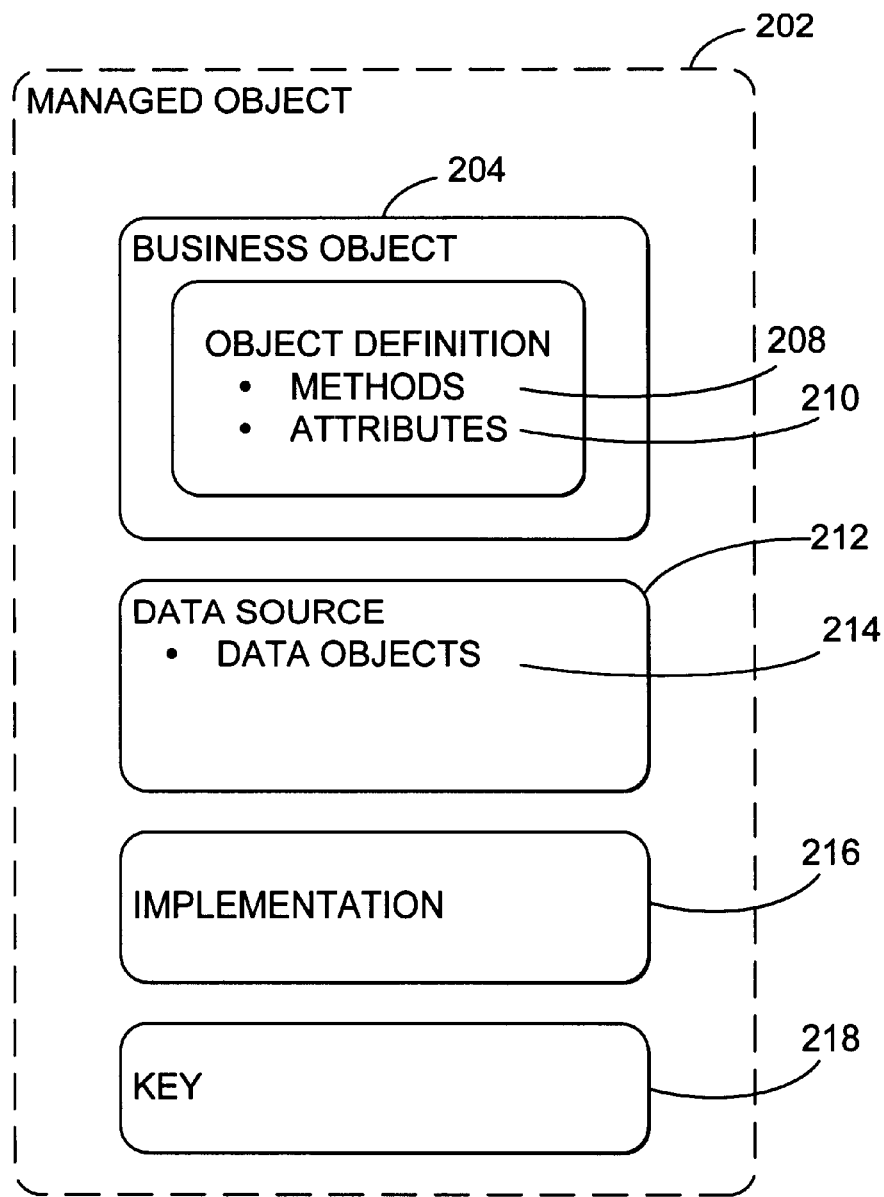
FIG. 2 is a diagram showing the contents of a managed object.

FIG. 2 is a diagram showing the contents of a managed object 202. Managed objects (MOs) 202 are a class of object that represents the component to the client application, and handles all calls from the client to the component on the computer 100 or server. Managed objects 202 handle communication with other classes, initialization, deinitialization, activation, and passivation of the business objects 204 included within the managed object 202. Managed objects 202 also define the set of methods that are implemented by the business object to work with the appropriate application. An application is defined by adding and configuring MOs 202.

A managed object 202 comprises a business object 204, a data source 212, an implementation 216, and a key 218. Business objects 204 include a plurality of object elements including one or more methods 208 and one or more attributes 210.

Methods 208 include code that implements the functions and define the behavior of the business object 204. Attributes 210 include variable definitions that define the states of the business object 204.

Business objects 204 are independent of any individual application and can be used in any combination to perform a desired task. Typical examples of business objects are: Customer, Invoice, or Account. A business object 204 may also have relationships with other business objects 204 and can cooperate with these other business objects to perform a desired task.

Business objects 204 do not have direct access to data. Instead, access to data is provided via a data source 212 including a data object 204. Data objects 214 are responsible for managing the persistence of a component's state data, and provide an interface for accessing state data. By providing an interface between business objects 204 and the data, the data object 214 isolates the business object 204 and relieves it from having to keep track of how to access and manage the data while maintaining persistency. Data objects 214 include a data object interface, which defines the state data of the component, and the data object implementation, which defines the form of persistence, and access patters for the data. Dummy data objects 214 are created when a business object 204 is created.

The managed object also comprises a key 218, which defines which attributes are to be used to find a particular instance of a component in a server. The key 218 consists of one or more of the business object 204 and attributes 210. Because COBRA does not permit passing a mix of different data types in a single call, the key 218 is defined as a separate class. This allows multiple attributes and data types to be mixed in any combination and allows the key to be changed, allowing more than one key for different situations, without affecting the remainder of the component. The implementation module 216 defines additional methods and implementing code.

Process

Figure 3:
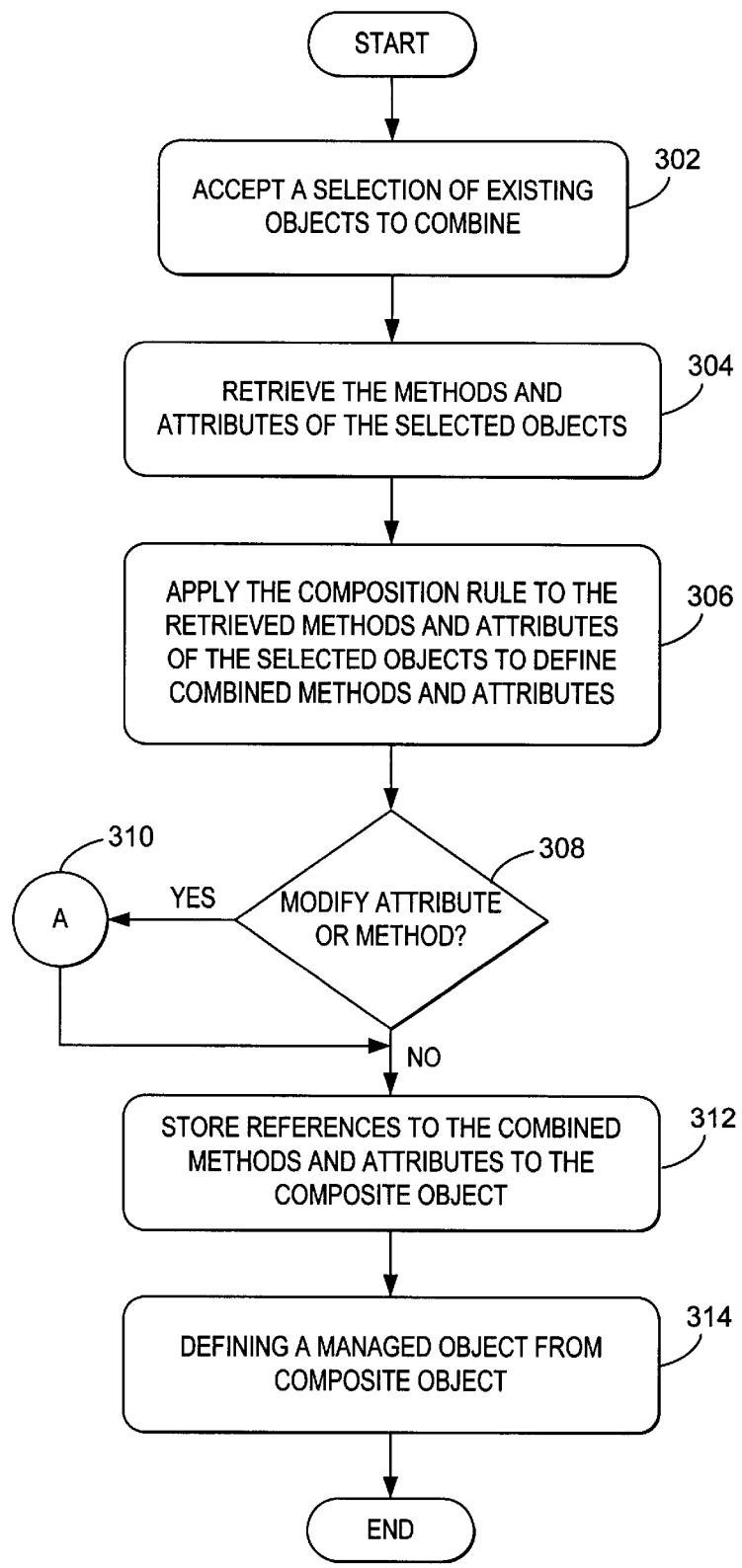
FIG. 3 is a flow chart showing the operations used to practice one embodiment of the present invention.

FIG. 3 is a flow chart showing the operations used to practice one embodiment of the present invention. The process begins by accepting a selection of existing objects to combine, as shown in block 302. Next, the method and attributes of the selected objects are retrieved, as shown in block 304. A composition rule is then applied 306 to the retrieved methods and attributes for the selected objects to define methods and attributes for the combined object.

The present invention permits modification of the combined object's attributes or method. If this feature is selected, block 308 directs the logical flow to block 310. If no methods or attributes of the combined object are to be modified, logical flow proceeds to block 312, where references to the combined methods and attributes are stored to the composite object. This effectively implements a "deep copy" of the appropriate methods and attributes, in that all pointers and other functional connectors between the attributes, methods, and other object elements are maintained.

The foregoing steps create composite business object from the selection of existing objects. To create a composite managed object, other elements, namely the key and the data object must be defined for the composite business object. This is depicted in block 314.

Figure 4:
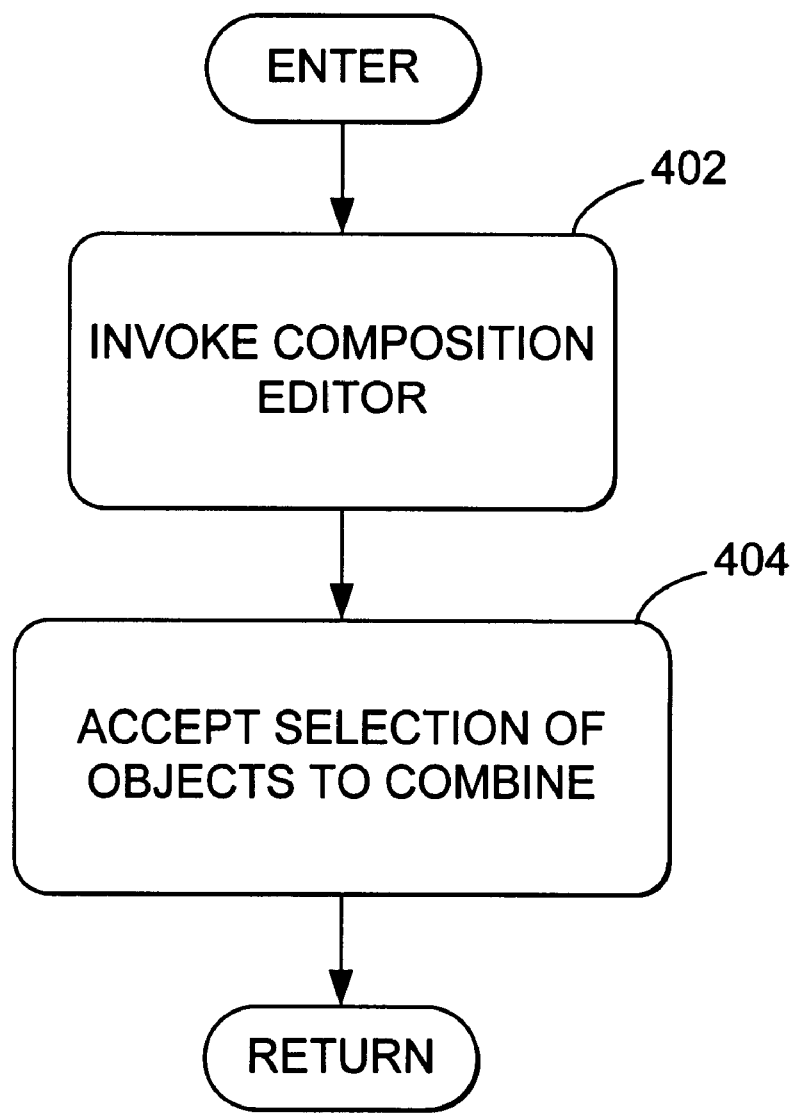
FIG. 4 is a flow chart depicting the operations used to accept a selection of existing objects.

FIG. 4 is a flow chart depicting the operations used to accept a selection of the existing objects to combine. A composition editor 132 is invoked, and a selection of objects to combine is selected, as shown in blocks 402 and 404.

Figure 5:
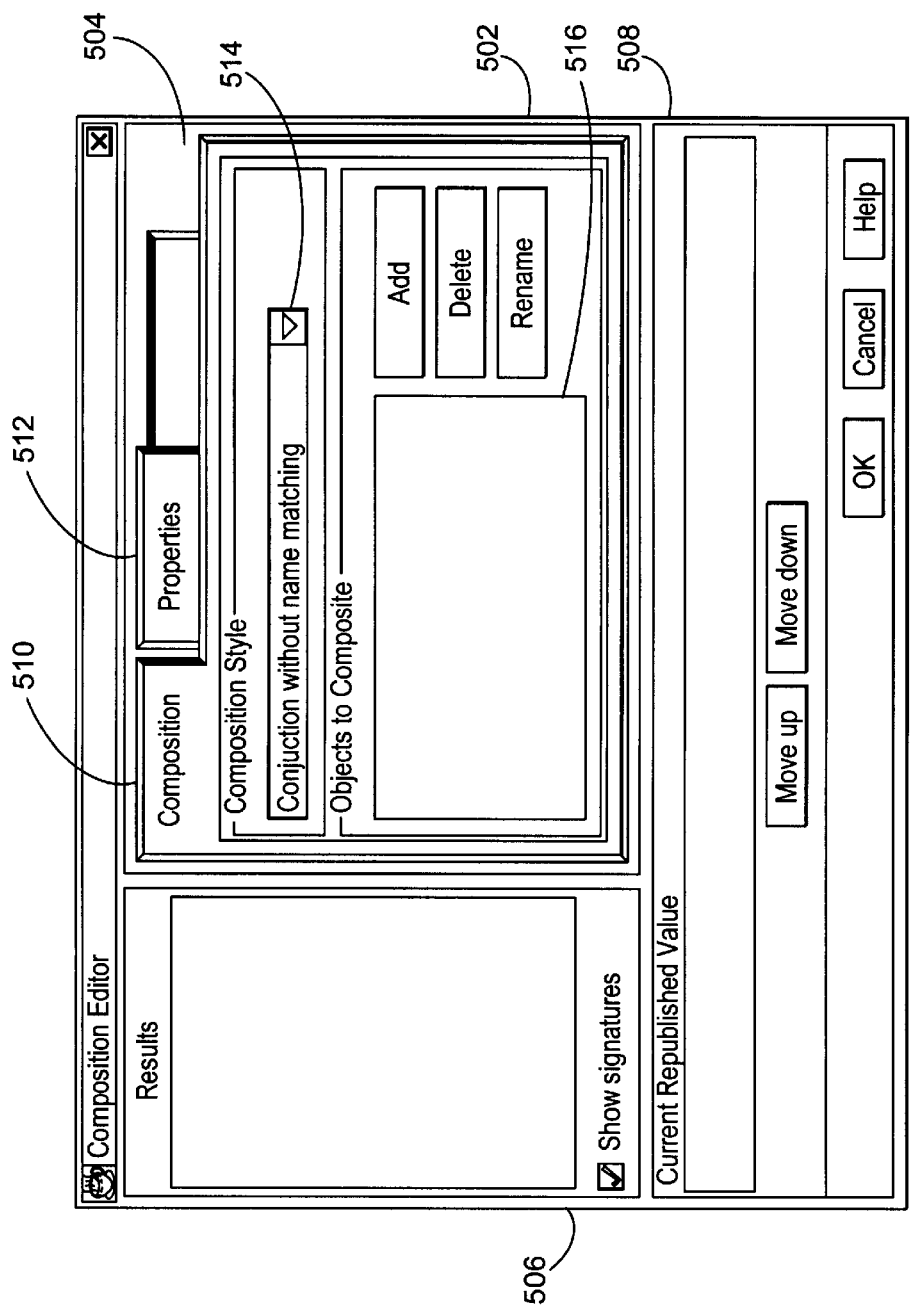
FIG. 5 is a diagram showing one embodiment of a composition editor user interface.

FIG. 5 is a diagram showing one embodiment of a composition editor 132 user interface, which is presented to the user when the composition editor 132 is selected. The interface comprises a composition editor window 502 with a first window portion 504, a second window portion 506, a third window portion comprising a composition style drop-down list 514, and a fourth window portion 508.

The first window portion 504 comprises a composition tab 510 and a properties tab 512. When the composition tab 510 is selected, composition style drop-down list 514 is presented in the third window portion, and an object composition box 516 is presented.

The composition style drop-down list 514 allows the user to select from a list of composition rules to be applied to the objects to be combined. FIG. 5 shows a default composition rule in which the methods and attributes from the objects will be conjoined without name matching. This means that the composite object will comprise all of the methods of the selected existing objects, and all of the attributes of the selected existing objects. "Name matching" indicates that the application of the composition rule will create a composite object comprising all of the methods and attributes of the existing objects, subject to the additional requirement that the method and attribute names are the same in both existing components. "Conjunction without name matching" indicates that application of the composition rule will result in all of the methods and attributes of the contributing objects. A disjunctive composition rule is also available, with or without word matching. A disjunctive composition rule indicates that the combined object should include the attributes and methods of all objects, but only one of the objects actually exists at runtime. Other composition rules with disjunctive characteristics can also be selected. For example, a rule may be selected that excludes the attributes and methods that are present in both of the existing objects to be combined.

The object composition box 516 shows which objects are available for combining. The second window portion 506 shows the results of the composition of the existing objects, and the fourth window portion 508 allows modification of the attributes and methods displayed in the second window portion 506, and allows new attributes and methods to be added to the composite object. Because no existing objects have been selected to be operated on by the composition editor 132, the object composition box 516 is empty. Both the object composition box 516 and the second window portion 506 are illustrated and further described in FIG. 7.

Figure 6:
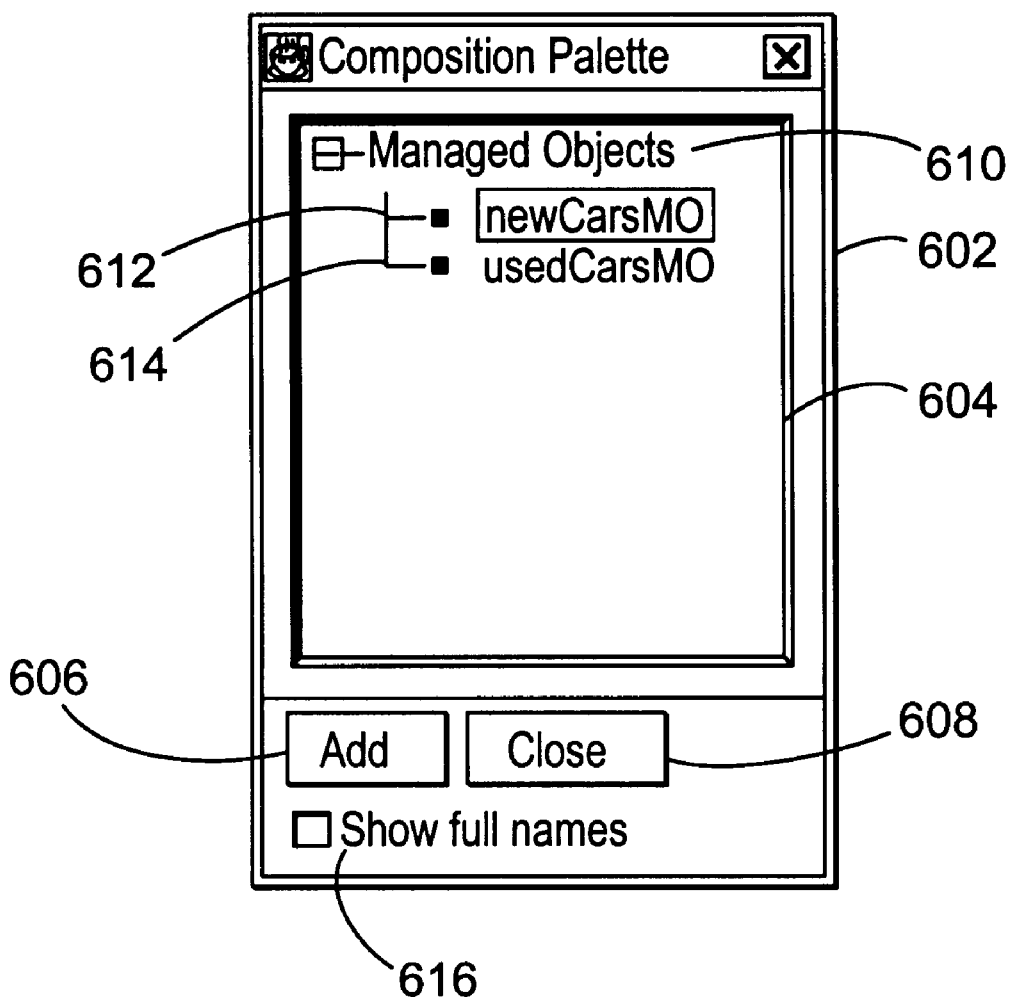
FIG. 6 is a diagram showing one embodiment of a composition palette interface used to specify objects to be combined by the composition editor.

FIG. 6 is a diagram showing one embodiment of a composition palette interface used to specify objects to be combined with the composition editor 132. The interface comprises a composition palette window 602 including a composition object selection box 604, add button 606, and a close button 608. The composition object selection box 604 displays a directory of managed objects 610, including a first managed object 612 called "newCarsMO" and a second managed object 614 called "usedCarsMO." The user can select which managed objects are to be combined by selecting managed objects in the composition object selection box 604, and selecting the add button 606. When completed, the user selects the close button 608. A name checkbox 616 is provided to show full managed object names in the composition object selection box 604.

Figure 7:
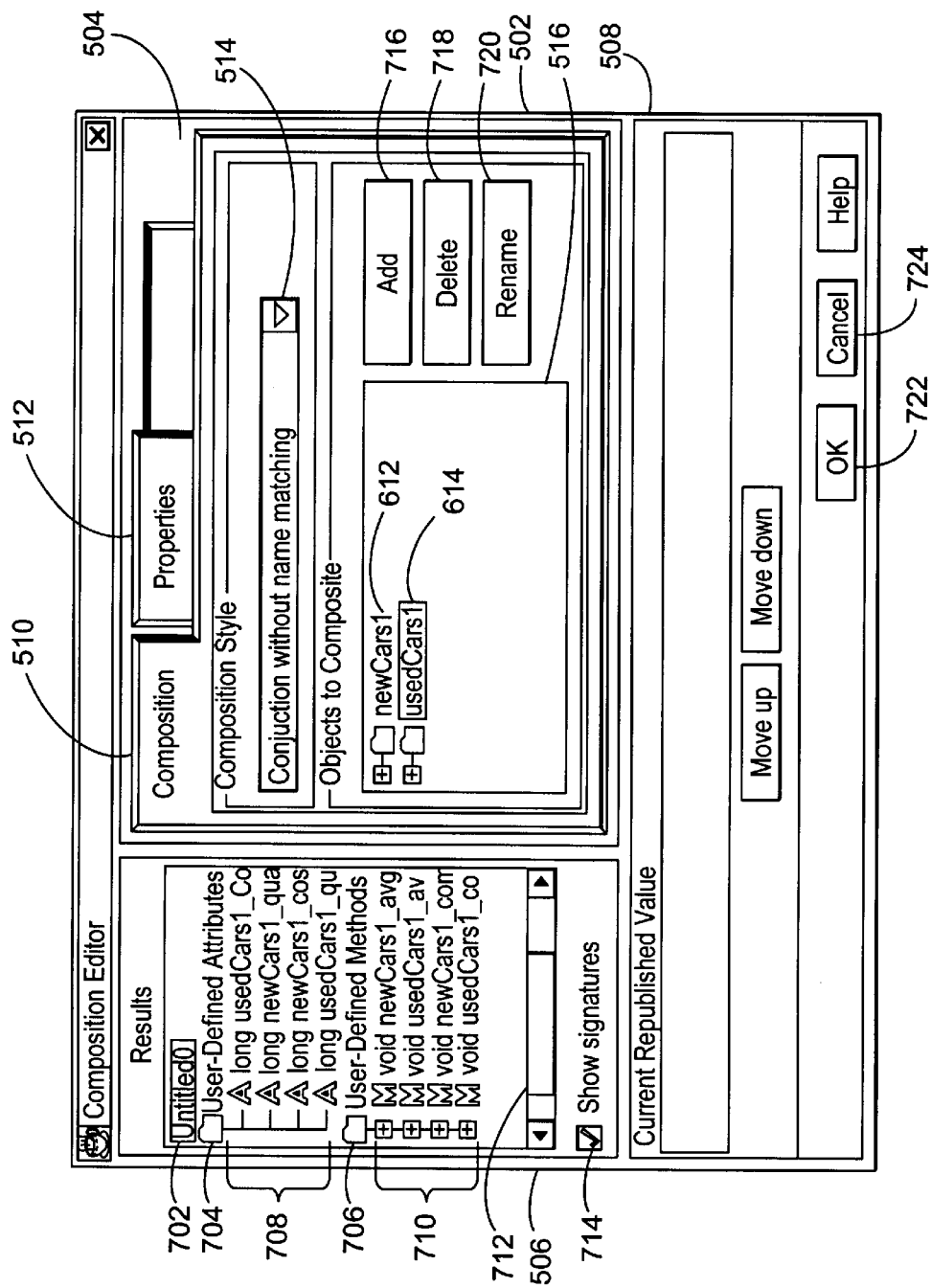
FIG. 7 is a diagram showing the composition editor user interface after the managed objects have been selected.

FIG. 7 is a diagram showing the composition editor window 502 after the first managed object 612 and the second managed object 614 have been selected to be used to generate a composite object. The object composition box 516 now shows the first managed object 612, and the second managed object 614. The selected managed objects in the object composition box 516 are combined according to the composition rule selected via the composition style drop-down list 514, and the methods and attributes from the resulting combination are displayed in the second window portion 506. The second window portion 506 displays the name of the composite object. When a new composite object is created, the default name is "Untitled" appended by an incremented number. Below the composite object name 702 is a first folder 704 having the attributes 708 and a second folder 706 having the methods 710 that resulted from application of the combination rule. Scroll bar 712 allows the entire length of the attributes and method names to be viewed. Signature check box 714 causes the method signatures (parameter names and types) to be shown.

Objects listed in the object composition box 516 are combined according to the composition rule in the composition style drop-down list 514 when add button 606 (depicted in FIG. 6) is depressed. The add button 716 causes the composition palette window 602 to be shown. Objects listed in the object composition box 516 can be deleted or renamed with delete button 718 and rename button 720, respectively.

Figure 8:
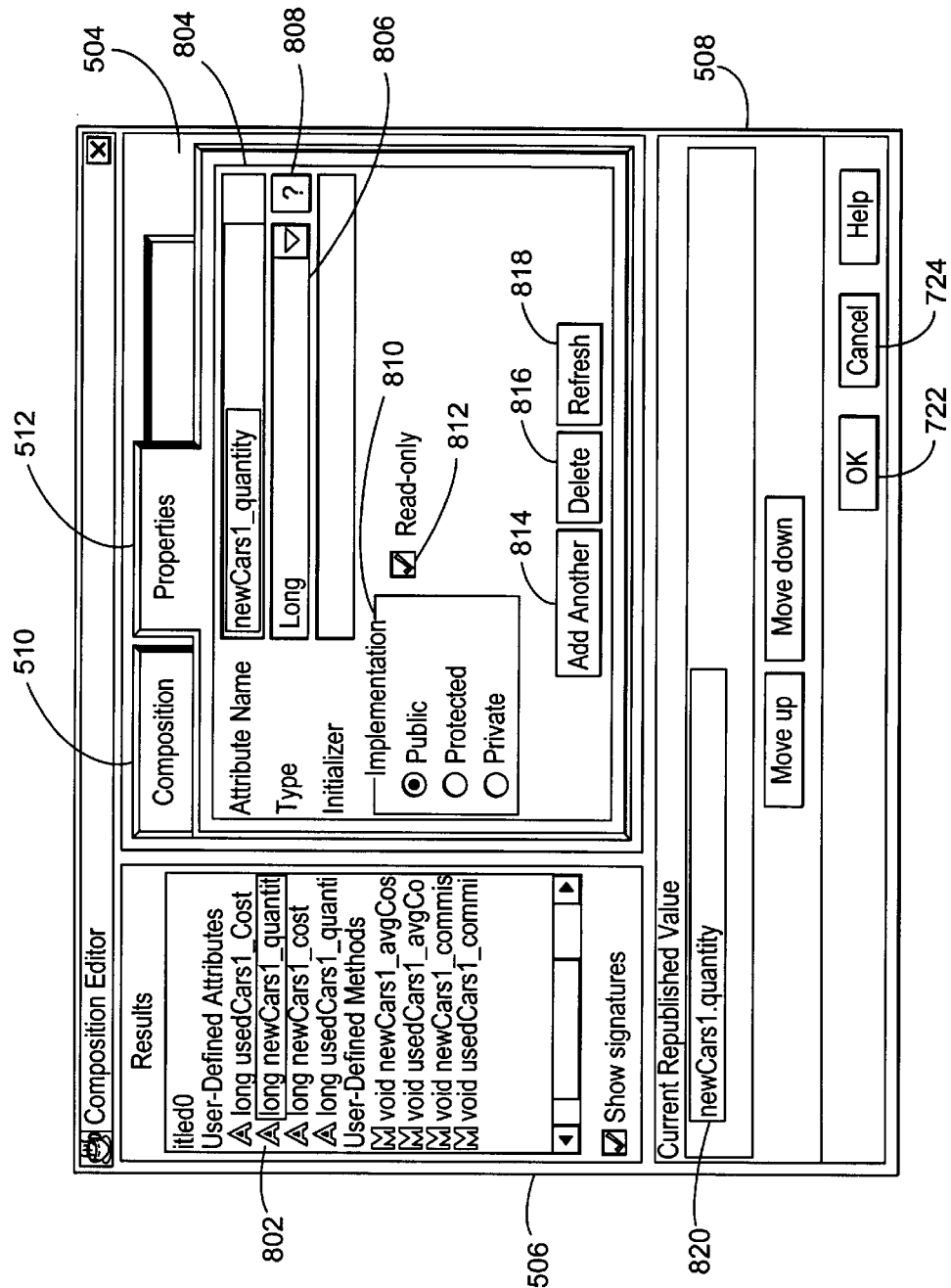
FIG. 8 is a diagram showing a second embodiment of the composition editor user interface.

FIG. 8 is a diagram showing another embodiment of the composition editor user interface. In the illustrated embodiment, one of the combined attributes 708, namely the "newCars1_quantity" attribute 802 is selected in the second window portion 506. When the properties tab 512 is selected, the first window portion 504 displays the properties of the selected combined attribute 802. The attribute name is displayed in attribute name box 804, and can be changed if desired. The attribute type is presented in an attribute drop-down list 806. For data types having an initializer (e.g. String), the initializer for the attribute 802 is displayed in the initializer box 808. Initializers reflect the value of an attribute when it is created.

The composition editor user interface first window portion 504 also shows a selectable radio button area 810 which indicates whether the attribute is public, protected, or private. The selectable radio button area 810 is also grayed where the selection cannot be changed. A read only selection box 812 is also provided. Similarly, if one of the combined methods 710 were selected instead of an attribute, the properties of that method would be viewable and changeable through the properties tab 512.

The first window portion 504 also comprises an add another button 814 which permits another attribute or method to be added to the composite object, a delete button 816 that allows the attribute or method to be deleted, and a refresh button 818 to display the most up to date version of the information in the first window portion.

The embodiment shown in FIG. 8 also comprises a fourth window portion 508 which shows the republished value of the attribute selected in the second window portion 506, allowing further editing of the attribute or method as is desired. This window is used when the user modifies an attribute or method, when the user creates a new attribute or method from existing attributes or method (by defining functional relationships among the attributes and methods, by renaming them, or by grouping them in a convenient way), and is further described with respect to FIGS. 9, 10, and 11.

Figure 9:
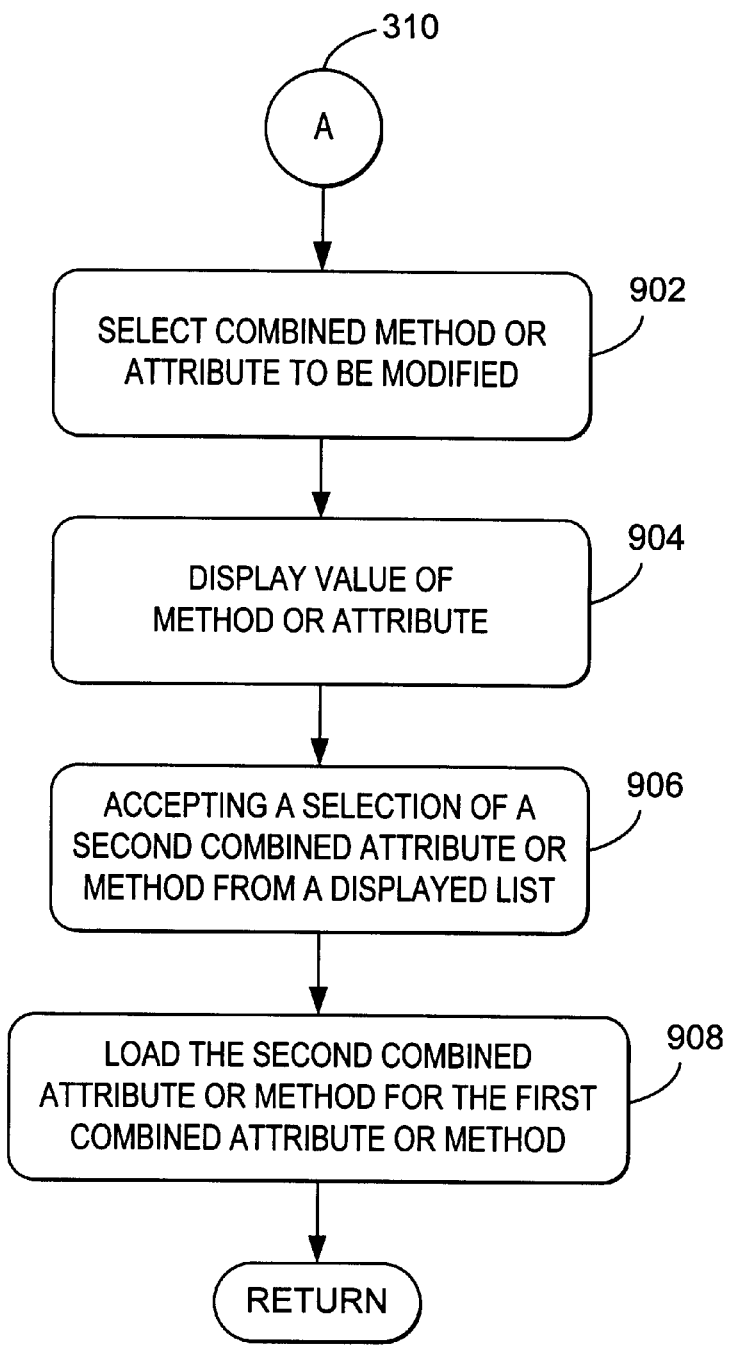
FIG. 9 is a flow chart illustrating the operations performed in modifying the attributes and methods of the combined object.

FIG. 9 is a flow chart illustrating the operations performed in modifying combined attributes or methods. First, the combined attribute 708 or method 710 to be modified is selected 902. Then, the value of the selected attribute 708 or method 710 is displayed 904 in the fourth window portion 508.

The user can then select a second combined attribute or method from a list of available combined attributes or methods to assign to the selected method from a displayed list. The computer 102 accepts 906 that selection, and loads the second selected combined attribute or method for the first combined attribute or method, as shown in block 908.

Figure 10:
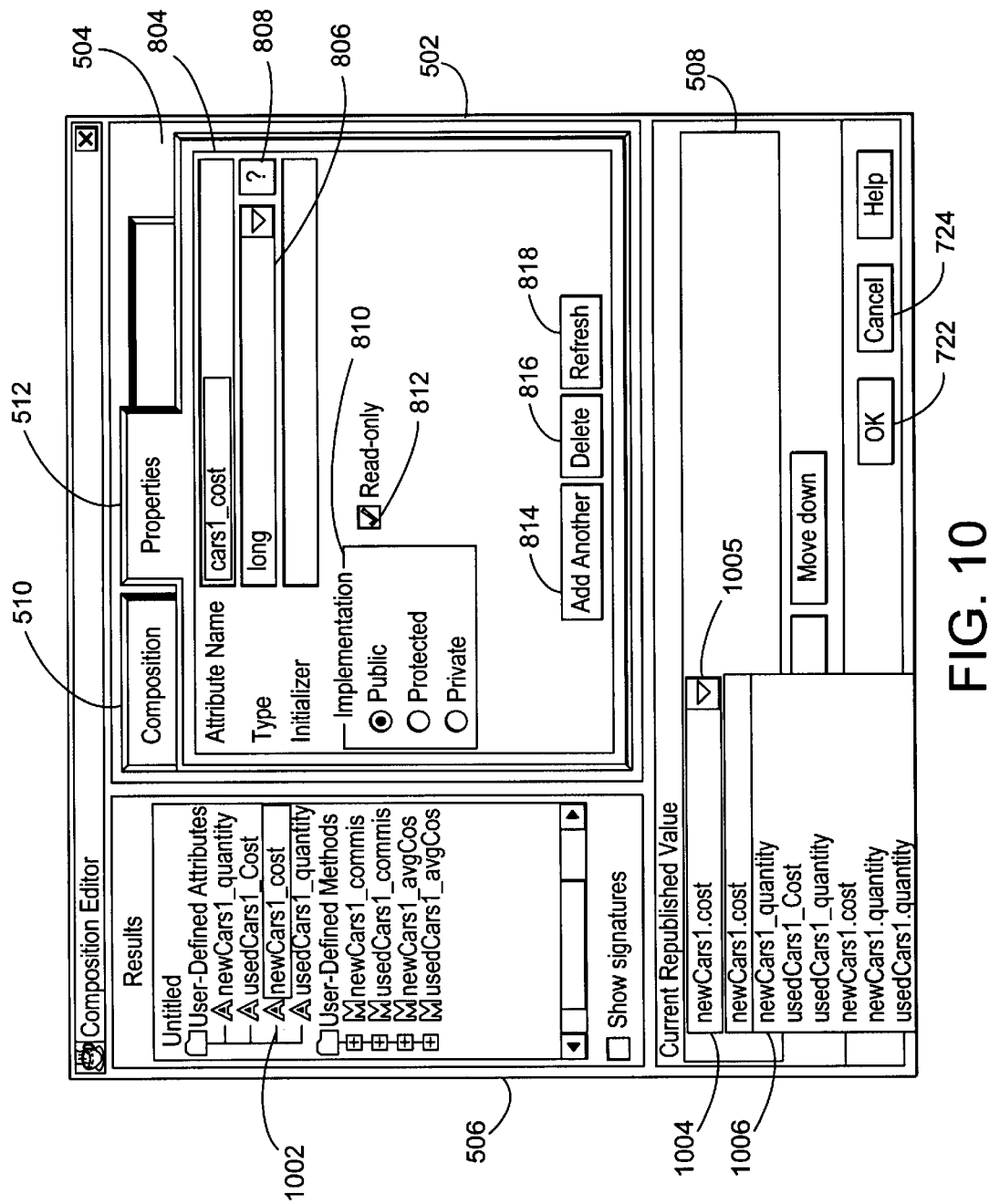
FIG. 10 is a diagram illustrating another embodiment of the composition interface in which attributes and methods are modified.

FIG. 10 is a diagram showing another embodiment of the composition editor 132 user interface. This embodiment provides a user interface for the operations described with respect to FIG. 9. After the user selects an attribute or method to be modified (attribute "newCars1_cost" 1002 in FIG. 10, for example), a drop-down list 1004 appears in the fourth window portion 508. The nominal input from this box is the current name of the attribute, as that selection will result in no changes to the attribute. When the user selects the drop down button 1005, a list of available attributes is presented for selection by the user. This list can be appropriately filtered by attribute type or other suitable parameter, to assure that the selected modification is a valid modification. By way of example, in the embodiment illustrated in FIG. 10, the attribute newCars1_cost can be made to take on characteristics of any of the attributes in drop-down list 1006.

Figure 11:
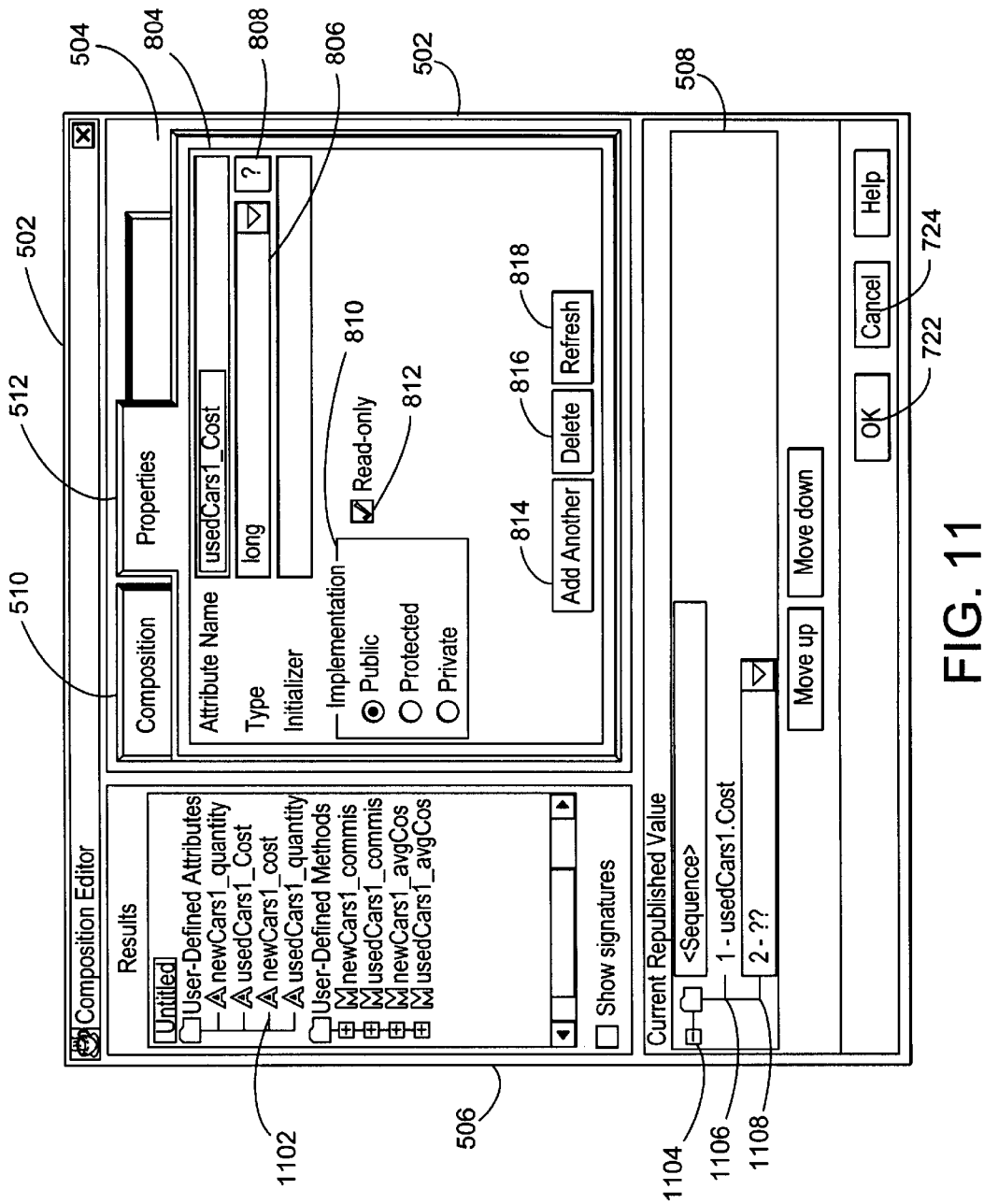
FIG. 11 is a diagram illustrating the modification of an attribute to include conjunctive and disjunctive sequences.

FIG. 11 shows another embodiment of the composition editor 132 user interface. In this embodiment, the selection of an attribute 1102 allows the user to assign an attribute to a conjunctive sequence of attributes or methods so that each of the attributes or methods in the sequence will be called when the selected combined attribute 1102 is called. Alternatively, a disjunctive sequence of attributes can be defined. In a disjunctive sequence, the differences between the selected objects can be used to specify which of the attributes are called when the selected attribute 1102 is called. For example, the sequence list may include three attributes, only one of which has a non-null value. If the user desires that the selected attribute 1102 take on the non-null value, the disjunctive sequence can be used to define this relationship.

Figure 12:
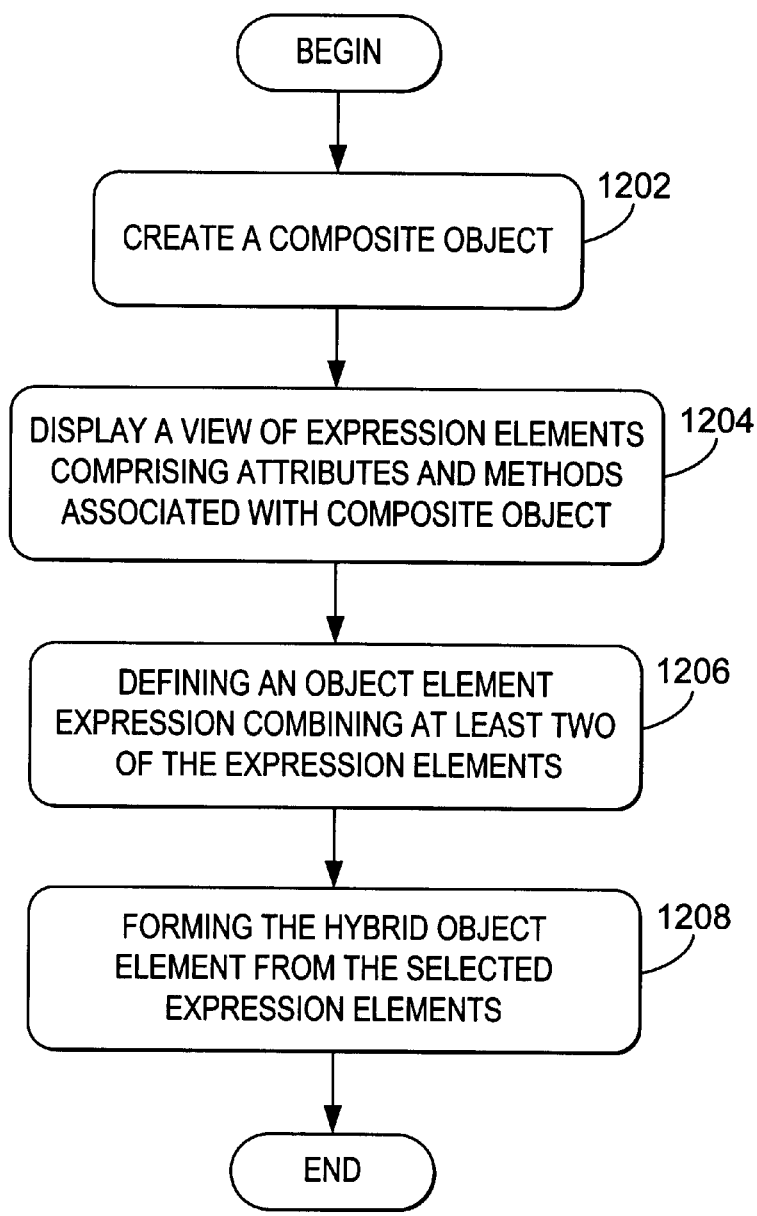
FIG. 12 is a flow chart illustrating the operations performed in the dynamic expression editor of the present invention.

FIG. 12 is a flow chart illustrating representative operations performed in creating hybrid object elements using a dynamic expression editor. First, using the methods and procedures described herein with respect to FIGS. 1–11, a composite object is created. This process, is represented in summary fashion by block 1202. A view of expression elements is then displayed 1204 on the display 122. The view, one embodiment of which is shown in view 1502, can include the attributes 210 and methods 208 for the composite object. Next, an object element expression combining at least two of the expression elements is defined. This is depicted in block 1206. Finally, a hybrid object element is formed from the selected expression elements. This is depicted in block 1208.

Figure 13:
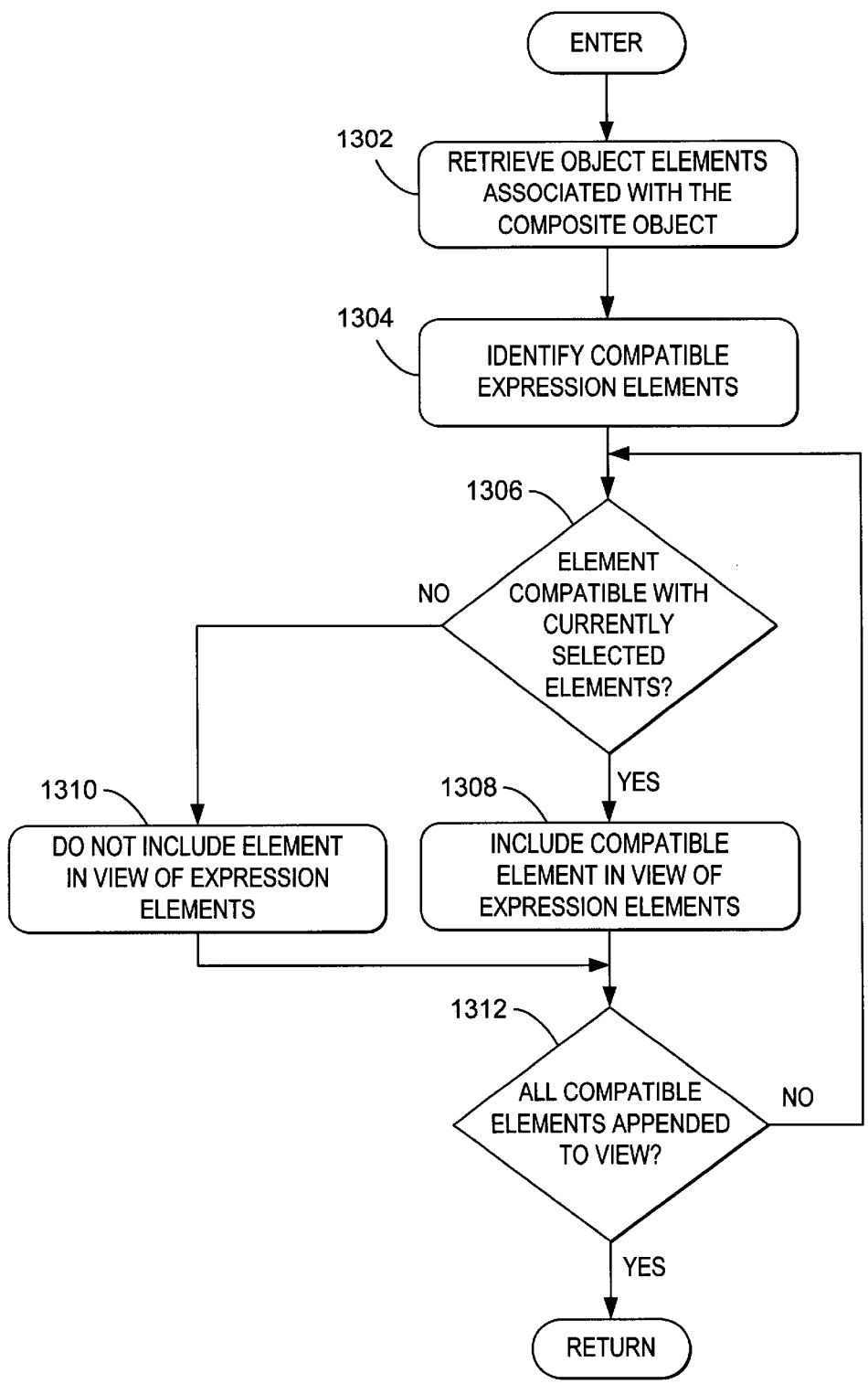
FIG. 13 is a flow chart illustrating the operations performed in displaying a view of the expression elements of the composite object.

FIG. 13 is a flow chart illustrating representative operations performed in displaying a view of the expression elements associated with the composite object. First, object elements (such as the methods 208 and attributes 210) associated with the composite object are retrieved from a global table stored in the data storage device 116. This is depicted in block 1302. Then, as depicted in block 1304, the retrieved object elements are examined to identify those which may be compatibly combined. By way of example, if the object elements being combined are comprised of two attributes, the attributes are here examined to assure that the attributes are of the same data type. For example, if a first object attribute has text data type, and a second has a numeric data type only, the two attributes are normally incompatible and should not be combined in the expression.

Once the compatible expression elements are determined, elements that are compatible with currently selected elements are included in the view of expression elements, and those that are incompatible are excluded from the view. This is shown in blocks 1306–1312.

Figure 14:
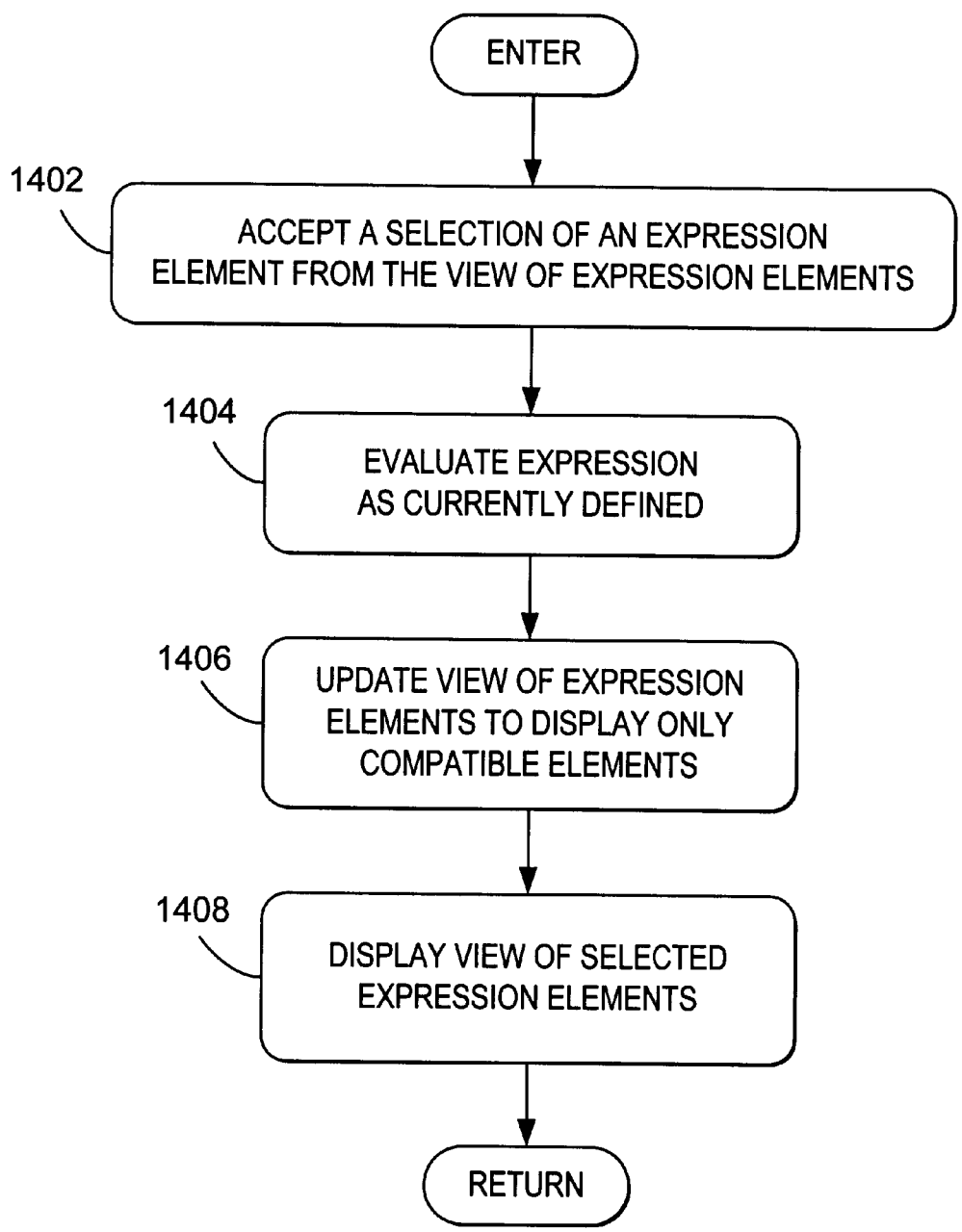
FIG. 14 is a flow chart illustrating the operations performed in forming a hybrid element from selected expression elements.
Figure 15:
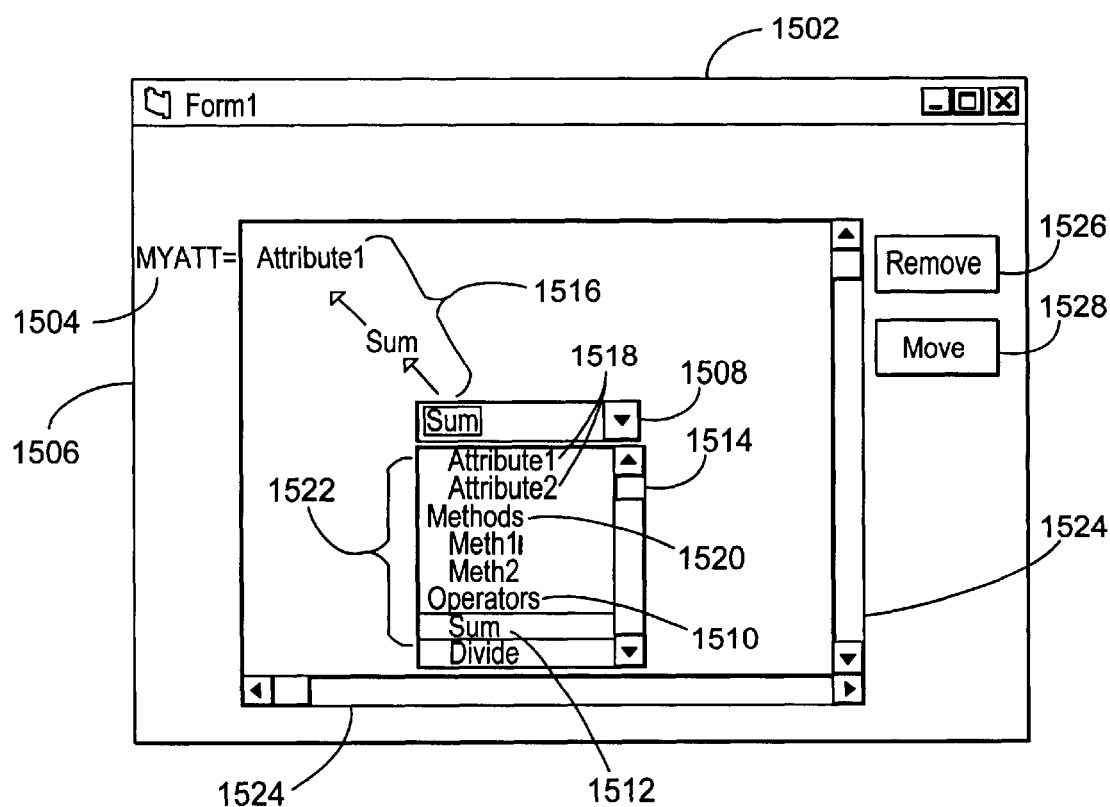
FIG. 15 is a diagram illustrating one embodiment of a dynamic expression editor graphical user interface.

FIGS. 14 and 15 describe the process of defining an object element expression. FIG. 14 is a flow chart illustrating representative operations performed in defining the object element expression, and FIG. 15 is a depiction of one embodiment of a graphical user interface for the dynamic expression editor which can be used to define the object element expressions. FIG. 15 depicts one embodiment of the view 1502 of the expression elements. Although shown as a separate window from the composition editor window 502, the view 1502 is ordinarily advantageously placed in the fourth window portion 508 to allow the dynamic expression editor to be used in conjunction with the other features of the composition editor window 502. View 1502 presents a name associated with the hybrid object element to be created 1504. In the illustrated embodiment, the hybrid element 1504 to be defined is named "MYATT", and for purposes of example, will be defined as the sum of two attributes. Although useful for purposes of example, it is important to note that the present invention as described herein and as claimed is not limited to defining hybrid attributes from the attributes of combined objects. The present invention also allows hybrid attributes or methods to be created from any combination of methods, attributes, and operators.

Referring to the flow of FIG. 14, the object element expression is defined by first accepting a selection of an expression element from a view of the expression elements, as shown in block 1402. In graphical user interface shown in FIG. 15, this is accomplished by juxtaposing a window sub-portion 1506 to the name of the hybrid object element 1504 to be defined. A drop-down list 1508 is then presented, which, when activated by depressing the down arrow, presents the methods 208 and attributes 210 which can be combined to create the hybrid object element. Drop-down list 1508 also presents operators 1510 such as a sum operator 1512, which can be used to combine the elements (including the methods 208 and attributes 210). The user selects one of the operators and object elements (using the scroll bar 1514 if necessary to view all of the available elements), one at a time, until all of the expression elements (as shown in selected expression element view 1516) have been selected. In the illustrated embodiment, the attribute "attribute1" was selected from the drop-down list 1508, then the "sum" operator 1512. As currently shown, the "sum" operator will be the next expression element.

The drop-down list 1508 moves along with the expression element view 1512 as new object elements or operators are added. Available attributes 1518, methods 1520, and operators 1510 can be organized with each other as shown (with attributes, methods, and operators co-located in the list), and can be alphabetized for easier use.

As the expression of elements is being defined, the drop-down list 1508 can be updated to assure that the options (in terms of methods, attributes, and operators 1522) presented to the user for further object element and operator selections can be validly combined with the expression as currently defined. For example, if the attributes or methods currently defined present a logical result, the operators presented to the user in the drop-down list 1508 would not include a sum or divide operator as shown, but may include boolean operators instead. This functionality is implemented by evaluating the expression as currently defined, updating, and displaying the view of the expression elements and operators to display only compatible elements and operators. This is depicted in blocks 1404–1408 of FIG. 14. In the alternative, the system can allow the user to define the expression, invoke a debugger functionality to evaluate the expression. In such cases, a debugger can highlight errors in the expression with further explanation or suggested changes, or a parsing editor can be used to identify and highlight errors without evaluating the expression.

In the disclosed embodiment, the drop-down list 1508 moves along with the selected expression element view 1516, and hence, scroll bars 1524 are provided in the window sub-portion 1506 to allow the viewing of the entire expression. The view 1502 also includes a remove button 1526 and a move button 1528. Expression elements can be moved or removed by selecting the element in the selected expression element view 1516, and selecting the appropriate button.

When the expression is complete, the user selects a "Done" input from the dropdown list 1508 to complete the expression definition. The user may also indicate that the expression is complete by selecting another pane, or through a button or similar interface element.

Conclusion

This concludes the description of the preferred embodiments of the present invention. The present invention describes a system, method, and article of manufacture for intuitively defining new attributes and methods as a function of existing attributes and methods.

The method comprises the steps of creating a composite object having object elements including methods and attributes combined according to a composition rule, displaying a view of expression elements comprising the attributes and methods of the composite object, defining an object element expression combining at least two of the expression elements, and forming the hybrid object element from the selected expression elements. In one embodiment, a drop-down list is used to select a series of attributes, methods and operators that comprise the expression defining the hybrid element.

The apparatus comprises means for performing the operations above, including a computer with a processor and memory coupled to a data storage device and a display. The article of manufacture comprises a tangible embodiment of instructions for performing the foregoing operations.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of forming a hybrid object element from a combination of existing objects, each existing object comprising at least one method and at least one attribute, comprising the steps of:

creating a composite object having object elements, the object elements including the methods and attributes of the existing objects combined according to a composition rule;

displaying a view of expression elements comprising the attributes and methods associated with the composite object;

defining an object element expression combining at least two of the expression elements; and forming the hybrid object element from the selected expression elements.

2. The method of claim 1, wherein the step of defining an object element expression comprises the step of repeatedly accepting a selection of an expression element until all of the expression elements of the hybrid element are defined.

3. The method of claim 2, further comprising the step of displaying a view of the selected expression elements.

4. The method of claim 2, wherein the step of displaying a view of expression elements comprises the step of retrieving the object elements associated with the composite object from a table.

5. The method of claim 4, further comprising the steps of:
identifying compatible expression elements; and
displaying only compatible expression elements in the view.

6. The method of claim 5, wherein only expression elements of the same type are displayed in the view.

7. The method of claim 2, wherein the view of expression elements further comprises operators defining relationships between the object elements.

8. The method of claim 7, wherein the view of expression elements further comprises at least one operator defining relationships between the object elements, and the step of repeatedly accepting a selection of an expression element comprises the steps of:
evaluating the object element expression; and
updating the view of the expression elements to display only compatible expression elements.

9. An apparatus for forming a hybrid object element from a combination of existing objects, each existing object comprising at least one method and at least one attribute, comprising:

means for creating a composite object having object elements, the object elements including the methods and attributes of the existing objects combined according to a composition rule;

means for displaying a view of expression elements comprising the attributes and methods associated with the composite object;

means for defining an object element expression combining at least two of the expression elements; and means for forming the hybrid object element from the selected expression elements.

10. The apparatus of claim 9, wherein the means for defining an object element expression comprises means for repeatedly accepting a selection of an expression element from the view until all of the expression elements of the hybrid element are defined.

11. The apparatus of claim 10, further comprising means for displaying a view of the selected expression elements.

12. The apparatus of claim 10, wherein the means for displaying a view of expression elements comprises means for retrieving the object elements associated with the composite object from a table.

13. The apparatus of claim 12, further comprising:

means for identifying compatible expression elements; and means for displaying only compatible expression elements in the view.

14. The apparatus of claim 13, wherein only expression elements of the same type are displayed in the view.

15. The apparatus of claim 10, wherein the view of expression elements further comprises operators defining relationships between the object elements.

16. The apparatus of claim 15, wherein the view of expression elements further comprises at least one operator defining relationships between the object elements, and the means for repeatedly accepting a selection of an expression element comprises:

means for evaluating the object element expression; and means for updating the view of the expression elements to display only compatible expression elements.

17. A program storage device, readable by computer having a processor and a memory, tangibly embodying one or more programs of instructions executable by the computer to perform the method steps of forming a hybrid object element from a combination of existing objects, each existing object comprising at least one method and at least one attribute, the method steps comprising the steps of:

creating a composite object having object elements, the object elements including the methods and attributes of the existing objects combined according to a composition rule;

displaying a view of expression elements comprising the attributes and methods associated with the composite object;

defining an object element expression combining at least two of the expression elements; and forming the hybrid object element from the selected expression elements.

18. The program storage device of claim 17, wherein the method step of defining an object element expression comprises the method step of repeatedly accepting a selection of an expression element until all of the expression elements of the hybrid element are defined.

19. The program storage device of claim 18, wherein the method steps further comprise the step of displaying a view of the selected expression elements.

20. The program storage device of claim 18, wherein the method step of displaying a view of expression elements comprises the method step of retrieving the object elements associated with the composite object from a table.

21. The program storage device of claim 20, wherein the method steps further comprise the method steps of:

identifying compatible expression elements; and displaying only compatible expression elements in the view.

22. The program storage device of claim 21, wherein only expression elements of the same type are displayed in the view.

23. The program storage device of claim 18, wherein the view of expression elements further comprises operators defining relationships between the object elements.

24. The program storage device of claim 23, wherein the view of expression elements further comprises at least one operator defining relationships between the object elements, and the method step of repeatedly accepting a selection of an expression element comprises the method steps of:

evaluating the object element expression; and updating the view of the expression elements to display only compatible expression elements.

* * * * *